United States Patent
Bos et al.

(10) Patent No.: US 11,853,814 B2
(45) Date of Patent: Dec. 26, 2023

(54) AUTOMATICALLY GENERATING EVENTS

(71) Applicant: SAP SE, Walldorf (DE)

(72) Inventors: Daniel Bos, Beijing (CN); Marcus Roland Schwarz, Lampertheim (DE); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 17/481,967

(22) Filed: Sep. 22, 2021

(65) Prior Publication Data
US 2023/0090729 A1 Mar. 23, 2023

(51) Int. Cl.
*G06F 9/54* (2006.01)
*G06F 16/22* (2019.01)
*G06F 16/23* (2019.01)
*G06F 16/25* (2019.01)

(52) U.S. Cl.
CPC .......... *G06F 9/542* (2013.01); *G06F 16/2291* (2019.01); *G06F 16/2358* (2019.01); *G06F 16/2379* (2019.01); *G06F 16/258* (2019.01)

(58) Field of Classification Search
CPC .. G06F 9/542; G06F 16/2291; G06F 16/2358; G06F 16/2379; G06F 16/258; G06F 16/24568
See application file for complete search history.

(56) References Cited

U.S. PATENT DOCUMENTS

| | | | |
|---|---|---|---|
| 7,904,302 B2 | 3/2011 | Adendorff et al. | |
| 8,707,336 B2 | 4/2014 | Appelbaum et al. | |
| 9,756,119 B2 | 9/2017 | Pareek et al. | |
| 9,798,626 B2 | 10/2017 | Cadarette et al. | |
| 2002/0129339 A1* | 9/2002 | Callahan, II | G06F 11/3664 714/E11.2 |
| 2002/0165998 A1* | 11/2002 | Hrebejk | G06F 9/542 719/318 |
| 2003/0018521 A1* | 1/2003 | Kraft | G06Q 30/02 705/14.15 |
| 2003/0225492 A1* | 12/2003 | Cope | G07C 5/008 701/14 |

(Continued)

OTHER PUBLICATIONS

Murphy, E., "Distributed Data for Microservices—Event Sourcing vs. Change Data Capture (/blog/2020/02/10/event-sourcing-vs-cdc/)," from https://www.redhat.com, 16 pages, Feb. 10, 2020.

(Continued)

*Primary Examiner* — Tuan C Dao
(74) *Attorney, Agent, or Firm* — Sterne, Kessler, Goldstein & Fox P.L.L.C.

(57) ABSTRACT

Disclosed herein are system, method, and computer program product embodiments for automatically generating events. In some embodiments, a server receives a request to subscribe to an event type for an application. The server identifies an entity in a data model corresponding to the event type. The entity is associated with application data of the application. Furthermore, the server subscribes to receive alerts associated with any change to the entity in the data model. The server receives an alert indicating a change to the entity in the data model. The alert includes the change to the entity. Moreover, the server generates an event corresponding to the event type based on the change to the entity and transmits the event to an event infrastructure.

18 Claims, 7 Drawing Sheets

(56) References Cited

U.S. PATENT DOCUMENTS

| | | | |
|---|---|---|---|
| 2004/0136025 A1* | 7/2004 | Moriyama | H04N 1/00087 358/1.14 |
| 2005/0138081 A1* | 6/2005 | Alshab | G06Q 10/06 |
| 2007/0112828 A1* | 5/2007 | Tischer | G06F 16/958 707/999.102 |
| 2007/0266377 A1* | 11/2007 | Ivanov | G06F 8/30 717/136 |
| 2008/0066082 A1* | 3/2008 | Choi | H04L 67/1001 719/318 |
| 2009/0265684 A1* | 10/2009 | Fuchs | G06F 8/34 717/105 |
| 2010/0161827 A1* | 6/2010 | Griesmer | H04L 12/2869 709/232 |
| 2011/0018998 A1* | 1/2011 | Guzik | H04N 21/21 348/143 |
| 2011/0270095 A1* | 11/2011 | Bukhman | A61B 5/349 607/45 |
| 2012/0235912 A1* | 9/2012 | Laubach | G06F 3/04886 345/163 |
| 2014/0082463 A1* | 3/2014 | Sitrick | G06F 40/106 715/202 |
| 2019/0102415 A1 | 4/2019 | Bishnoi et al. | |
| 2019/0156034 A1* | 5/2019 | Kedem | G06Q 20/16 |
| 2020/0250169 A1 | 8/2020 | Lee et al. | |
| 2020/0379973 A1 | 12/2020 | Liu et al. | |

OTHER PUBLICATIONS

Nastasa, D., "The whys and hows of Change Data Capture," Blog Post, 9 pages, Oct. 2, 2020.

Valeri, F., "Build a simple cloud-native change data capture pipeline," Red Hat Developer Blog Articles, 13 pages, Jul. 2, 2020.

* cited by examiner

AUTOMATICALLY GENERATING EVENTS

BACKGROUND

Organizations have increasingly started using hybrid landscapes with disparate systems distributed across a given premise and in the cloud. Furthermore, these disparate systems may be from different vendors. As such, data integration between applications across these disparate systems can be challenging. Often, these organizations implement peer-to-peer connections between the systems. However, this can be very cumbersome and operationally expensive.

The organizations also use events for systems to communicate with each other. However, producing events remains a challenging task. The default option to create events is to collect all relevant information as part of the application coding itself, then send the event to the message broker from the application—during the regular processing. However, this requires adapting each application to generate events while performing its other tasks. This can negatively affect the performance of the application and can be an error-prone and cumbersome process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically generating events.

As described above, data integration across disparate systems can be a challenging task. Conventionally, organizations established peer-to-peer connections between the systems to implement data integration. This meant that every respective system needed to "speak the language" of other respective systems. As the number of systems increases, this quickly becomes prohibitively complex.

Organizations also use events for systems to communicate with each other. However, conventionally, individual applications have been responsible for generating an event and transmitting them to other systems or applications. This configuration poses at least the following three challenges:

1. Every application needs to be adapted to collect all relevant information to produce the event and send the event to a message broker.
2. Each application is tightly coupled to the specific implementation of the events and message broker that is chosen.
3. Creating and sending the events may negatively impact the application's performance, particularly if the events are large or frequent.

Embodiments described herein solve these problems by decoupling the generating of events from the application. In some embodiments, a server receives a request to subscribe to an event type for an application. The server identifies an entity in a data model corresponding to the event type. The entity is associated with the application data of the application. Furthermore, the server subscribes to receive alerts associated with any change to the entity in the data model. The server receives an alert indicating a change to the entity in the data model. The alert includes the change to the entity. Moreover, the server generates an event corresponding to the event type based on the change to the entity and transmits the event to an event infrastructure.

The embodiments described herein allow for detecting changes on the relevant data, reconstruct the changed entity, and generate the events. The events may be sent to the message broker automatically. This eliminates the need for the application to generate the event. As such, this approach decouples the creation and publishing of events from the application, so the format of the events or the particular message broker can be changed easily. Additionally, embodiments described herein are stateless and do not require additional effort for application developers, nor does it require additional configuration for each event subscription. Moreover, since the event generation happens asynchronous to the application code, the performance impact is minimized.

Figure 1:
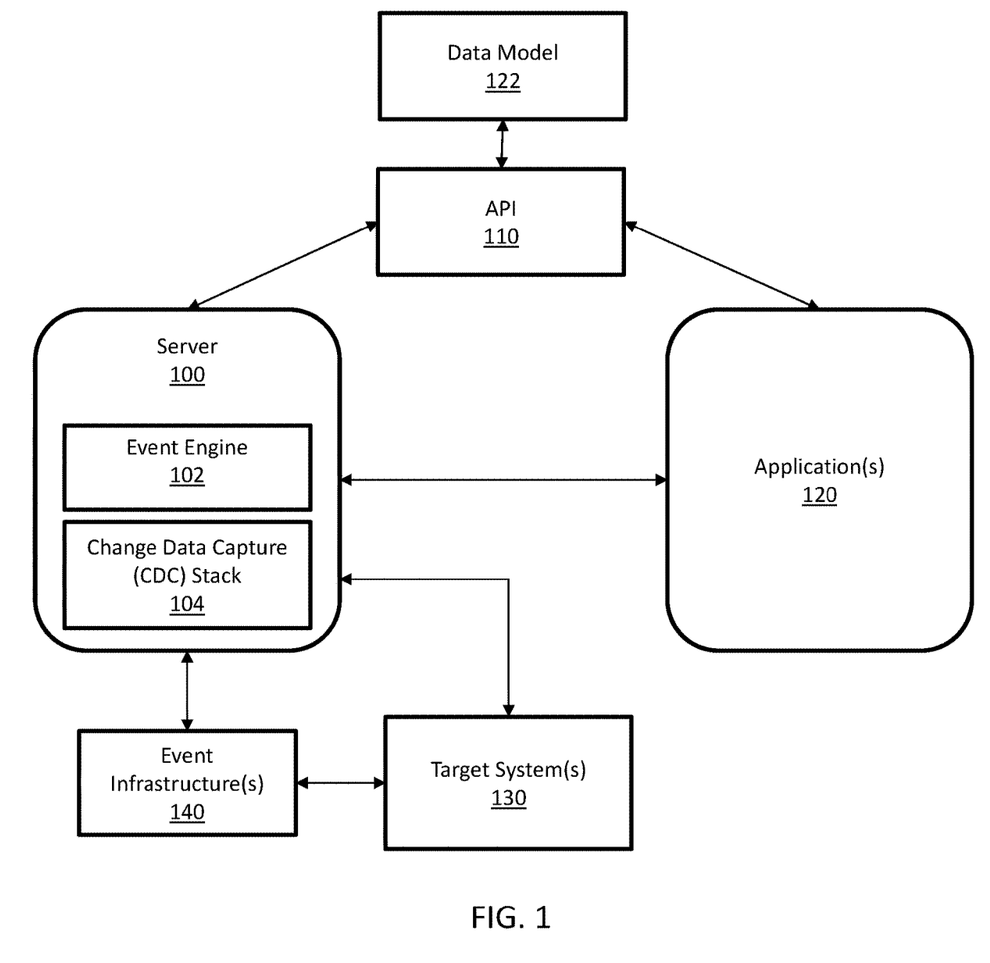
FIG. 1 is a block diagram of a system for automatically generating an event, according to some embodiments.

FIG. 1 is a block diagram of a system for automatically generating an event, according to some embodiments. In an embodiment, the architecture may include server 100, Application Program Interface (API) 110, application(s) 120, data model 122, target system(s) 130, event infrastructure(s) 140. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Data model 122 may be one or more databases configured to store application data for one or more application 120. The databases may include one or more data tables and views. The application data may be data output or used by application 120. The application data may include one or more entities associated with application 120. These entities may correspond with data values.

Data model 122 may be within the same premise as where application 120 is being hosted. Alternatively, data model 122 may reside in a cloud computing environment. Similarly, application 120 may reside on a local server or in a cloud computing environment.

API 110 may store annotations regarding the application data stored in data model 122. The annotations may describe the application data. Furthermore, as will be described below, the annotations may describe events associated with particular entities of the application data.

Server 100 may include event engine 102 and change capture data (CDC) stack 104. CDC stack 104 may generate triggers in data model 122 so that CDC stack 104 is alerted when certain application data in data model 122 has been updated. CDC stack 104 captures the updates to the application data, transforms the updates to the application data, and transmits the updates to event engine 102 and target systems 130.

Event engine 102 may be configured to identify and generate an event based on the updates to the application data. Event engine 102 may transmit the generated event to event infrastructure 140.

Event infrastructure 140 may be configured to receive, collect, and forward (or publish) events to target systems 130. In some embodiments, event infrastructure 140 may implement a message broker. The message broker may receive events in the form of messages. The message broker may forward the message to the appropriate target system 130.

Target systems 130 may be distributed systems configured to host one or more applications or data models. One or more applications or data models on target systems 130 may be configured to receive updates to application data. Furthermore, one or more applications or data models on target systems 130 may subscribe to events generated by event engine 102. These events may be associated with application 120.

Figure 2:
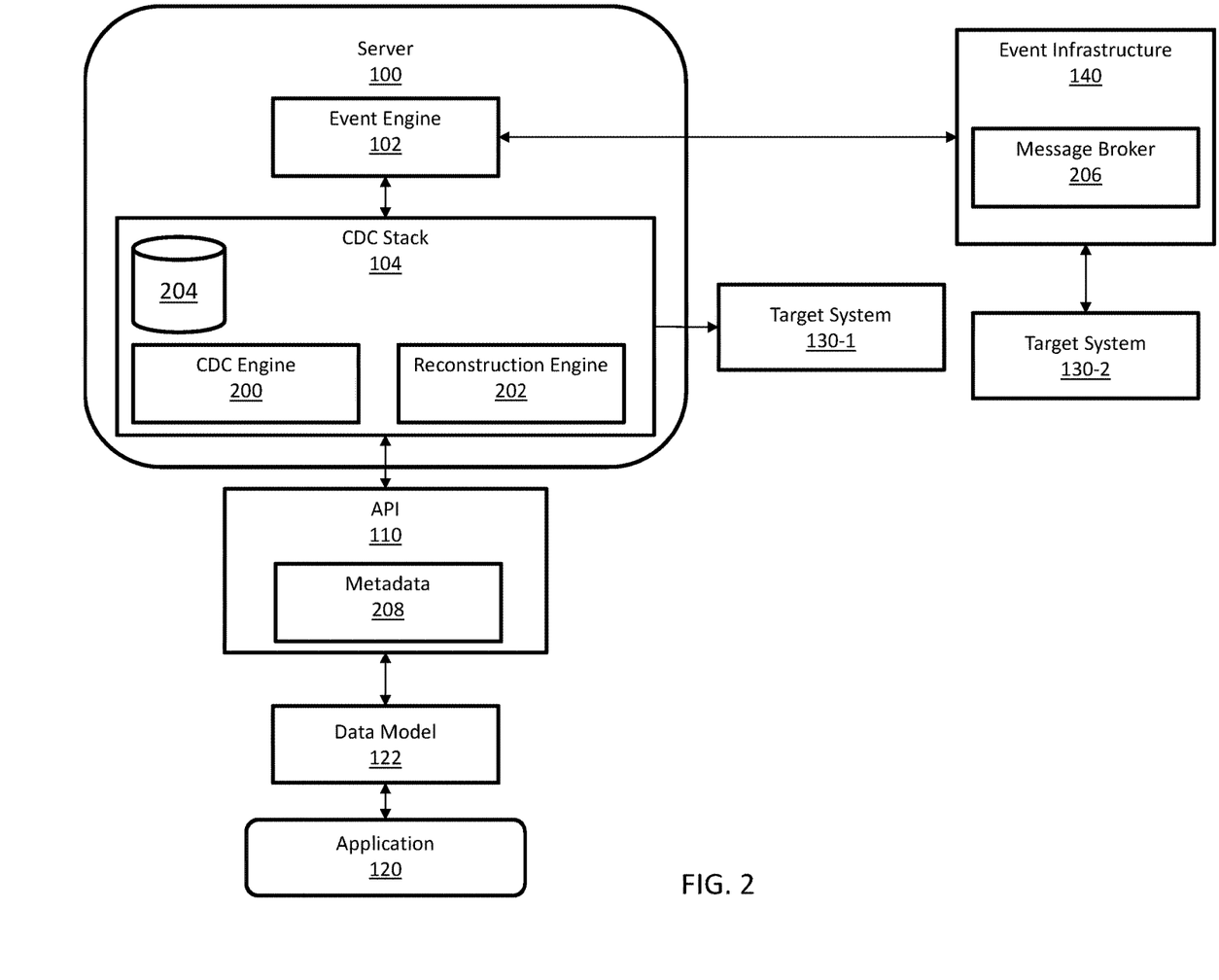
FIG. 2 is a block diagram illustrating the data flow in the system for generating events, according to some embodiments.

FIG. 2 is a block diagram illustrating the data flow in the system for generating events, according to some embodiments. As described with respect to FIG. 1, the system for generating events includes server 100, API 110, application 120, event infrastructure 140. The system may also include target system 130-1 and target system 130-2. Target systems 130-1 and 130-2 may be similar to target system 130.

As further described above, server 100 may include event engine 102 and CDC stack 104. CDC stack 104 may include CDC engine 200, reconstruction engine 202, and a data storage device 204. Moreover, event infrastructure 140 may include message broker 206.

In some embodiments, target system 130-2 may transmit a request to event infrastructure 140 to subscribe to a particular event type. This may indicate that target system 130-2 may want to receive alerts/messages associated with the particular event. Message broker 206 may forward the request to event engine 102.

Event engine 102 may receive the request. Event engine 102 may determine that the particular event type is associated with one or more entities. The entities may be application data that is associated with application 120. As a non-limiting example, event engine 102 may determine that the particular event type may be the "inventory status of a given product in a retail store." This event type may be associated with events related to the inventory of a given product falling below a predetermined threshold, delays in shipping additional inventory, overflow of inventory, etc. Application 120 may be configured to receive and process requests for the "inventory status of a given product in a retail store." As such, event engine 102 may determine that application 120 outputs and uses application data associated with a current quantity of a given product in a retail store. Therefore, event engine 102 may identify one or more entities associated with the particular type of event.

Event engine 102 may transmit a request to CDC stack 104 to subscribe to updates to one or more entities associated with the particular type. The updates may include additions, deletions, or modifications.

CDC stack 104 may receive the request from event engine 102. The request may include conditions or threshold values associated with each respective entity that would cause CDC stack 104 to message/alert event engine 102. Each respective entity may be generated using values of one or more data fields in data tables in data model 122. CDC stack 104 may identify the one or more data fields used to build each respective entity. In some embodiments, CDC stack 104 may use annotations 208 stored in API 110 to identify one or more data fields for each respective entity. For example, annotations 208 may be semantic objects and annotations used by application 120 to build the entities. Annotations and semantic objects provide semantic information about data fields (e.g., "Field A contains the currency-code for the value in Field B", or "exchange-rates for the currency-code in Field A can be found in table XYZ", etc.).

Furthermore, annotations and semantic objects may indicate the data fields used to build a respective entity. In some embodiments, annotations 208 may include annotations for entities to shape events produced based on the entities. For example, the annotations may reduce data fields used to build the entity, change flat structures into deep structures, etc. To this end, CDC stack 104 may use the annotations and semantic objects to identify the data fields in data model 122 associated with each respective entities that need to be monitored.

CDC stack 104 may transmit a request to API 110 to generate triggers in data model 122 for the identified data fields associated with each respective entity that needs to be monitored. The triggers may be a stored procedure that automatically executes when an event happens on a given table or view. Continuing from the above example, an entity may be the current quantity of a given product in a retail store. The data fields corresponding to the entity may include "orders", "purchases", "returns," etc. In this regard, API 110 may generate a trigger for each of these data fields in data model 122. The trigger may be a procedure to transmit a message/alert to CDC stack 104 each time there is an update to the respective data field's respective value. In some embodiments, the trigger may include instructions to message/alert CDC stack 104 when there is an update to the respective data field more than a predetermined threshold. The predetermined threshold may be different for each respective data field.

Each time a value of these data fields is updated more than the predetermined threshold, the trigger may transmit a message/alert to API 110. The message/alert may include the updated value. API 110 may transmit the message/alert to CDC stack 104. CDC engine 200 may store the updated data fields in logging tables in data storage device 204. In some embodiments, the message/alert may include an updated row from a data table (tuple). The updated tuple may include one or more data fields used to build the entity. CDC engine 200 may store the updated tuple in the logging table.

As stated above, each entity may correspond with one or more data fields. Continuing from the above example, an entity associated may be a current quantity of a given product. The current quantity of a given product may be built using the values of the data fields of "purchases," "returns," and "orders." As such, reconstruction engine 202 may reconstruct the entity (e.g., the current quantity of a given product) using the updates to the values of the data fields (e.g., "purchases," "returns," and "orders"). In some embodiments, reconstruction engine 202 may use annotations 208 to determine how to reconstruct the entity. Reconstruction engine 202 may use the values of the data fields in the logging tables to reconstruct the entity. In some embodiments, reconstruction engine 202 may use the updated tuple to reconstruct the entity.

In some embodiments, reconstruction engine 202 may wait until each of the values for all of the data fields associated with the respective entity are updated before reconstructing the entity. Alternatively, reconstruction engine 202 may use one or more of the data fields associated with the respective entity to reconstruct the entity.

Once the entity is reconstructed, CDC stack 104 may determine which system is configured to receive a message or alert indicating the update to the data fields associated with the entity. For example, CDC stack 104 may determine that target system 130-1 and event engine 102 are configured to receive the message or alert. CDC stack 104 formats or prepares the entity in a format that is compatible with target system 130-1 and event engine 102, respectively. CDC stack 104 transmits the reconstructed entity to target system 130-1 and event engine 102.

In some embodiments, CDC stack 104 may implement data masking for sensitive information based on predefined rules for the respective data fields in annotations 208. The reconstructed entity may mask the sensitive information. This may prevent event engine 102 from transmitting sensitive information to various systems.

Event engine 102 may receive the entity from CDC stack 104. Event engine 104 may parse the entity to identify the type of event indicated by the entity. Continuing from the above example, the entity may be the current quantity of a given product in a retail store. Event engine 202 may determine that the entity indicates that the quantity of a given product is lower than a threshold amount. As such, event engine 102 may determine that the entity corresponds with the event related to the inventory of a given product falling below a predetermined threshold. This event may be associated with the event type "inventory status of a given product in a retail store." Event engine 102 may determine that target system 130-2 is subscribed to receive events associated with the event type "inventory status of a given product in a retail store" (e.g., the event related to the inventory of a given product falling below the predetermined threshold). Event engine 102 may generate the event related to the inventory of a given product falling below the predetermined threshold. The event may be in a format acceptable to event infrastructure 140 (e.g., Advanced Message Queuing Protocol (AMQP)). Generating the event may format the entity's data such that it is compatible with event infrastructure 140. For example, general rules may be used to resolve specific data types to a standard format (e.g., timestamps can be automatically resolved to UTC using the available semantic information, currency values can be resolved into ISO formats, etc.). Event engine 102 may transmit the event to event infrastructure 140 using an appropriate communications protocol.

Event infrastructure 140 may receive the event from event engine 102. The event may include updated data associated with the entity. The event may also indicate an identifier for target system 130-2. Message broker 206 may forward the event to target system 130-2 based on the identifier. In some embodiments, the event may be intended for one or more target systems 130.

Once event engine 102 transmits the event to event infrastructure, event engine 102 may transmit a request to CDC stack 104 to commit the updates to the entity in data storage device 204. This way, CDC stack 104 may acknowledge that event engine 102 has processed the updates to the entity and should be alerted next time there are updates to the entity. In some embodiments, if the CDC stack 104 fails to receive a request to commit the updates to the entity in data storage device 204 after a predetermined threshold amount of time, CDC stack 104 may re-send the update to the entity.

In some embodiments, the system for generating alerts may include multiple event infrastructures 140. Each event infrastructure 140 may be configured to transmit a particular type of message. Alternatively, the multiple event infrastructures 140 may be configured to communicate with different target systems 130-2.

Event engine 102 may store configuration data associated with the multiple event infrastructures 140. The configuration data may include a mapping of the event infrastructures 140 and the corresponding entity. That is, event engine 102 may use the configuration data and the content of an entity to determine which event infrastructure 140 to send the event.

In some embodiments, application 120 may introduce logic to shape or filter the events. The logic may be rules on how to generate the events. Event engine 102 may use the rules to generate the events. The logic may also be implemented using one or more APIs.

Figure 3:
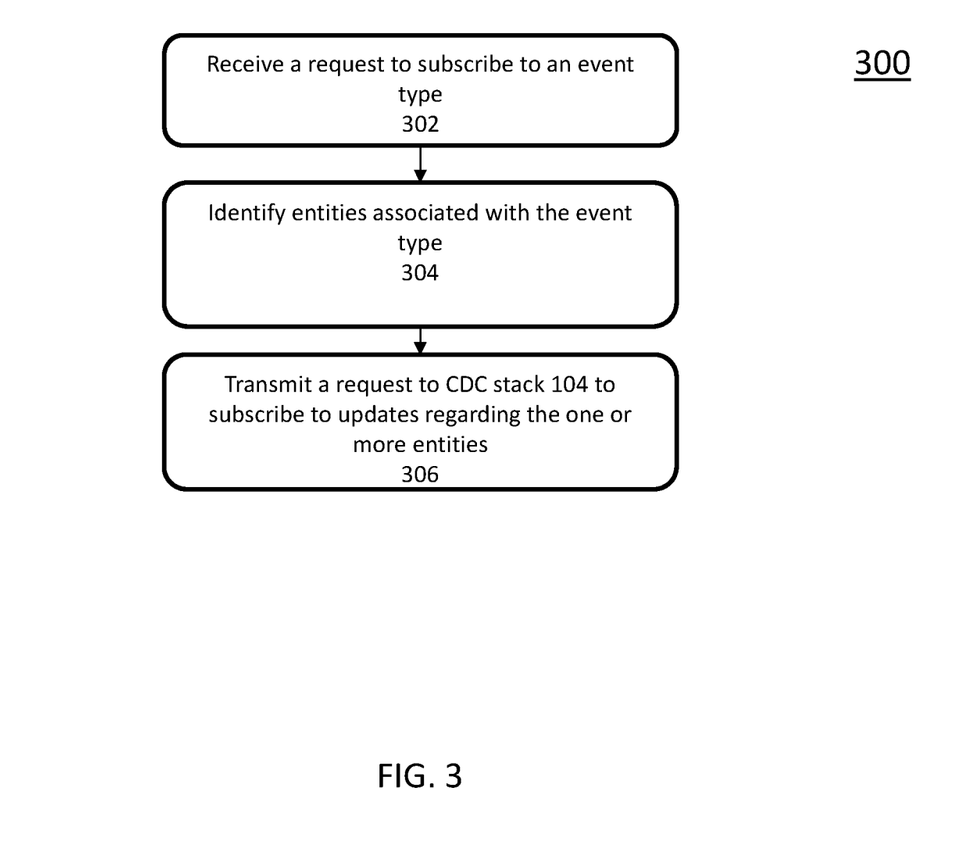
FIG. 3 is a flowchart illustrating a process for subscribing to updates to entities, according to some embodiments.

FIG. 3 is a flowchart illustrating a process for subscribing to updates to entities, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIGS. 1-2. However, method 300 is not limited to that example embodiment.

In 302, event engine 102 receives a request to subscribe to an event type. Event engine 102 receives the request from event infrastructure 140. Event infrastructure 140 may receive a request to subscribe to the event type from target system 130-2. Target system 130-2 may include one or more applications and data models. The applications and data models may use the events to trigger/execute predetermined procedures and/or actions.

In 304, event engine 102 identifies entities associated with the event type. Entities may be one or more data fields in data model 122. Moreover, entities may be built by application 120. The entities may be used by application 120 to execute operations or output by application 120. Event engine 102 may parse the content of the event type to identify the entities associated with the event type. An event type may be associated with one or more events. Each of the one or more events may be associated with one or more entities.

In 306, event engine 102 transmits a request to CDC stack 104 to subscribe to updates regarding the one or more entities. The request may include the one or more entities. The request may also include rules for the subscription. For example, the request may include predetermined thresholds for values for data fields associated with the entity. CDC stack 104 may use the threshold to determine that a message/alert should be transmitted to event engine 102 if one or more values of the data fields associated with the entity is higher or lower than the predetermined thresholds.

Figure 4:
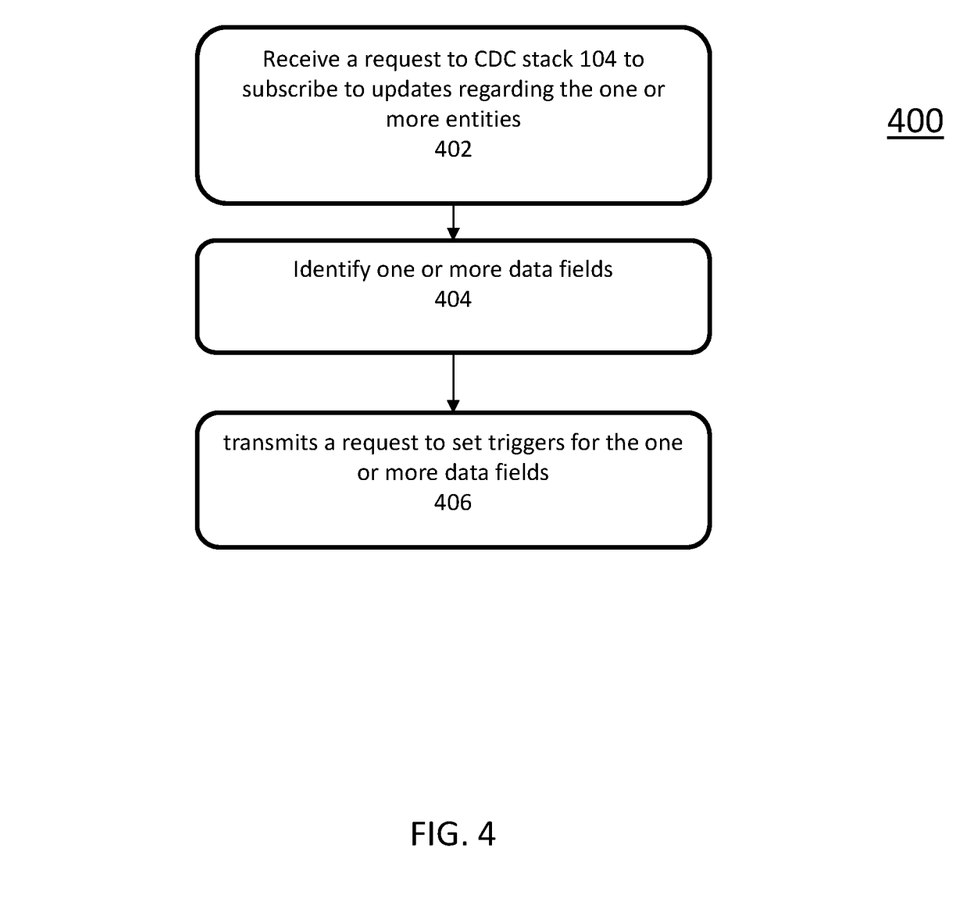
FIG. 4 is a flowchart illustrating the process of generating triggers, according to some embodiments.

FIG. 4 is a flowchart illustrating the process of generating triggers, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIGS. 1-2. However, method 400 is not limited to that example embodiment.

In 402, CDC stack 104 receives a request to subscribe to updates regarding one or more entities, as described in method 300 with respect to FIG. 3. The request may include the one or more entities. The request may also include rules for the subscription. For example, the request may include predetermined thresholds for values for data fields associated with the entity. CDC stack 104 may use the threshold to determine that a message/alert should be transmitted to event engine 102 if one or more values of the data fields associated with the entity is higher or lower than the predetermined thresholds.

In 404, CDC stack 104 identifies one or more data fields for each entity in data model 122. The one or more data fields may be in one or more data tables of data model 122. CDC stack 104 identifies the one or more data fields based on annotations 208 in API 110. Annotations 208 may include schematic objects and annotations that describe the data fields used to construct the entities. As such, CDC stack 104 may identify the respective entity in annotations 208 and identify the one or more data fields used to construct the respective entity.

In 406, CDC stack 104 transmits a request to API 110 to set triggers for the one or more data fields for each respective entity in data model 122. The request may include the triggers. The triggers may instruct the data model 122 to transmit a message/alert to CDC stack 104 in response to a value of the respective data field changing more than a predetermined threshold. The trigger may include the predetermined threshold. The predetermined threshold may be different for each of the one or more data fields. API 110 may set the triggers for each of the one or more data fields.

Figure 5:
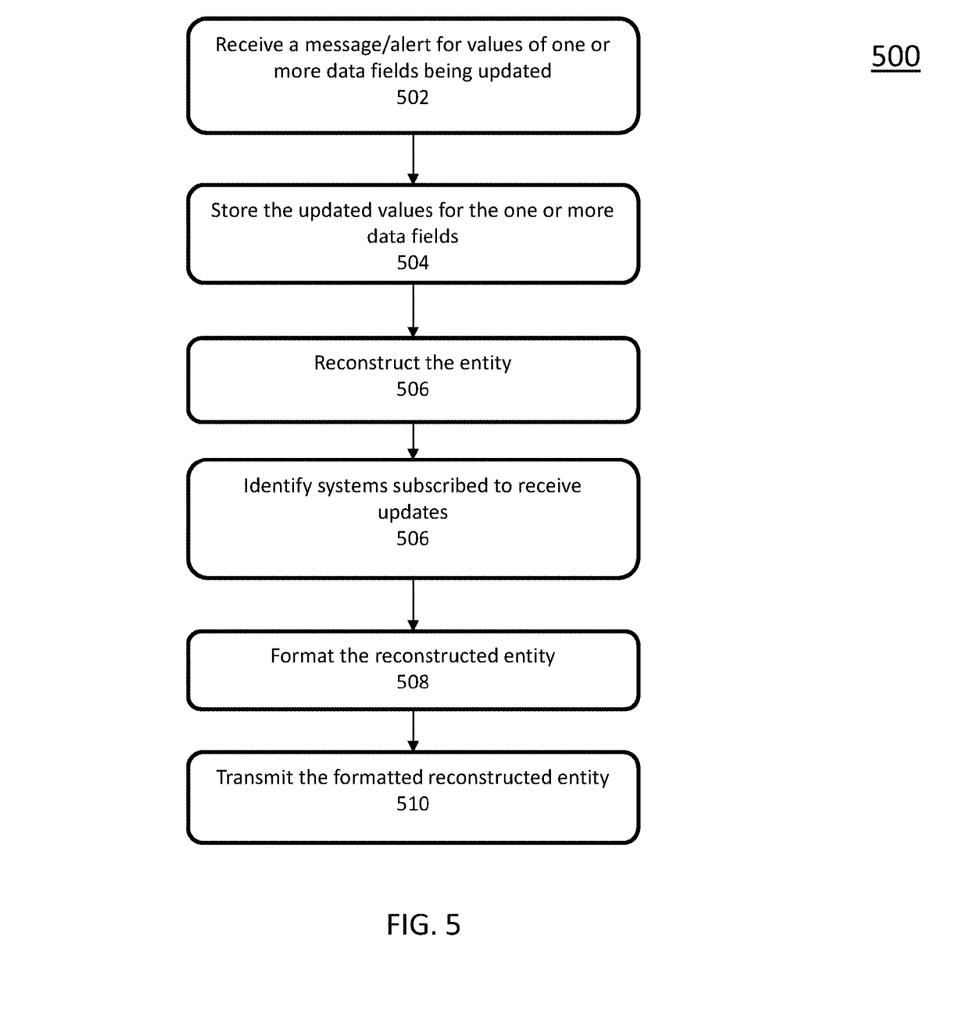
FIG. 5 is a flowchart illustrating a process for receiving data field updates and reconstructing entities, according to some embodiments.

FIG. 5 is a flowchart illustrating a process for receiving data field updates and reconstructing entities, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIGS. 1-2. However, method 500 is not limited to that example embodiment.

In 502, CDC stack 104 receives a message/alert for values of one or more data fields being updated in data model 122. The message/alert may include the new values of the one or more data fields. The one or more data fields may be associated with an entity. Data model 122 may transmit the message/alert, via API 110, based on a trigger generated for the respective data field, as described in method 400 with respect to FIG. 4.

In 504, CDC stack 104 stores the updated values for the one or more data fields in logging tables in data storage device 206. The updated values for the one or more data fields may have updated more than a threshold amount, as indicated in the respective trigger.

In 506, CDC stack 104 reconstructs the entity associated with the one or more data fields using the updated values of the one or more data fields. CDC stack 104 may use the values of the one or more data fields stored in the logging table. In some embodiments, CDC stack 104 may wait to receive updated values for all of the data fields associated with the entity before attempting to reconstruct the entity. Alternatively, CDC stack 104 may attempt to reconstruct the entity in response to receiving updated values for more than a threshold number of data fields associated with the entity. In this scenario, CDC stack 104 may use the current values of data fields in data model 122, which were not updated. CDC stack 104 may reconstruct the entity based on annotations and schematic objects in annotations 208.

In 508, CDC stack 104 identifies systems subscribed to receive updates regarding the reconstructed entity. For example, the systems may include target systems 130-2 and event engine 102.

In 510, CDC stack 104 formats the reconstructed entity such that it is compatible with the systems that are subscribed to receive updates regarding the reconstructed entity. For example, the CDC stack 104 may format the reconstructed entity such that it is compatible with target system 130-2 and event engine 102.

In 512, CDC stack 104 transmits the formatted reconstructed entity to the systems that are subscribed to receive updates regarding the reconstructed entity. For example, CDC stack 104 may transmit the formatted reconstructed entity to target system 130-2 and event engine 102.

Figure 6:
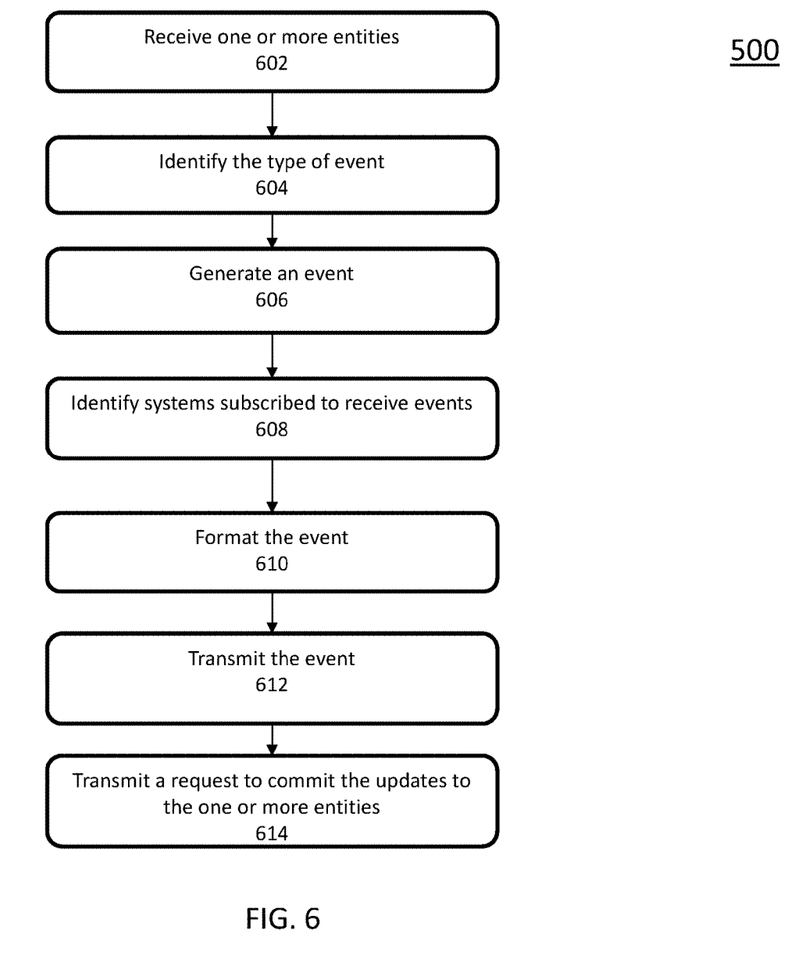
FIG. 6 is a flowchart illustrating a process for generating events, according to some embodiments.

FIG. 6 is a flowchart illustrating a process for generating events, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIGS. 1-2. However, method 600 is not limited to that example embodiment.

In 602, event engine 102 receives one or more entities associated with a particular event. Event engine 102 may receive the one or more entities from CDC stack 104 as described in method 500 with respect to FIG. 5. The entity may include values one or more data fields that have been updated in data model 122.

In 604, event engine 102 identifies the type of event based on the content of the one or more entities. For example, event engine 102 may identify the type of event based on the data fields associated with the respective entity and the corresponding values.

In 606, event engine 102 generates an event using the one or more entities. Event engine 102 may use the one or more data fields and the corresponding values to generate the event.

In 608, event engine 102 identifies the systems that are subscribed to receive events of the particular type. For example, event engine 102 may determine that target system 130-1 is subscribed to receive the event of the particular type.

In 610, event engine 102 formats the event such that it is in a format compatible with event infrastructure 140. For example, the format may be AMQP. Formatting the event may transform the data based on predefined rules (e.g., rules regarding date formats, currency, etc.).

In 612, event engine 102 transmits the event to event infrastructure 140 using the appropriate communications protocol. Message broker 206 may forward the event to target system 130-1. In some embodiments, message broker 206 may forward the event one or more target systems 130.

In 614, event engine 102 transmits a request to CDC stack 104 to commit the updated values of the data fields corresponding to the one or more entities. This way, CDC stack 104 knows that event engine 102 has successfully generated and transmitted the event.

Figure 7:
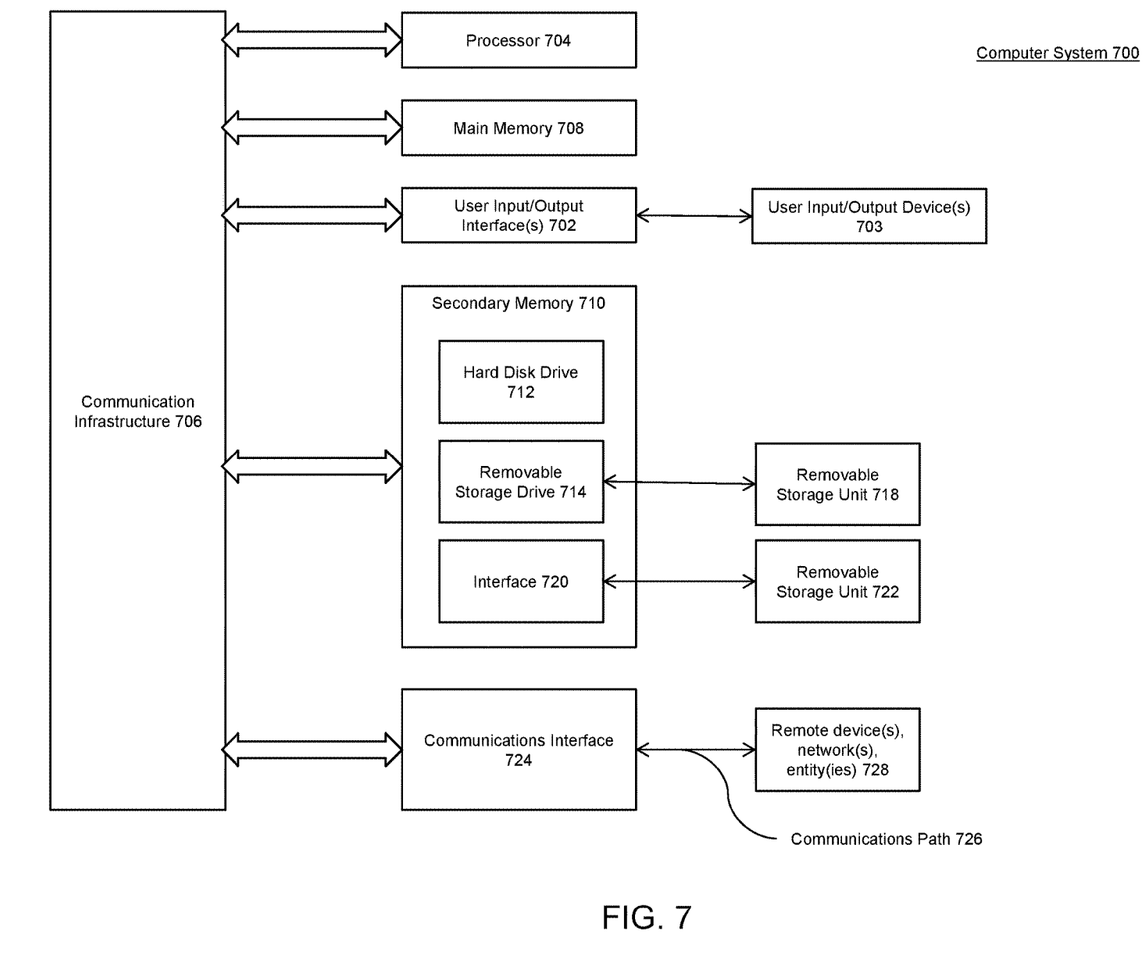
FIG. 7 is an example computer system useful for implementing various embodiments.

Various embodiments can be implemented, for example, using one or more computer systems, such as computer system 700 shown in FIG. 7. Computer system 700 can be used, for example, to implement methods 300 of FIG. 3, 400 of FIG. 4, 500 of FIG. 5, and 600 of FIG. 6. Furthermore, computer system 700 can be at least part of server 100, target system 130, data model 122, and event infrastructure 140, as shown in FIG. 1. For example, computer system 700 route communication to various applications. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method for creating events, the method comprising:
   receiving, by a processor, a request to subscribe to an event type for an application;
   identifying, by the processor, an entity in a data model corresponding to the event type, wherein the entity is associated with application data of the application, wherein the entity comprises one or more data fields corresponding to the application, including a first data field and a second data field;
   subscribing, by the processor, to receive an alert associated with any change to the entity in the data model;
   receiving, by the processor, the alert indicating a first change to the entity in the data, model, wherein the alert includes the change to the entity;
   identifying a first threshold associated with the first data, field and a second threshold associated with the second data field, wherein the first threshold is different from the second threshold;
   determining that the first change comprises a change to the first data field exceeding the first threshold, or a change to the second data field exceeding the second threshold;
   generating, by the processor, an event corresponding to the event type based on the first change to the entity; and
   transmitting, by the processor, the event to an event infrastructure.

2. The method of claim 1, wherein receiving the alert comprises receiving the alert from a change data capture engine, and wherein the change data capture engine is configured to identify one or more data fields in the data model corresponding to the entity, generate one or more triggers in the one or more data fields to capture changes in data in the one or more data fields, format the data in a first predetermined format, and transmit formatted data in the alert.

3. The method of claim 2, further comprising committing, by the processor, the changes to the data in the one or more data fields in a data storage device corresponding to the data, capture engine.

4. The method of claim 2, wherein the data model includes annotations to the data, in the one or more data fields, and the annotations include information about constructing the entity using the one or more data fields.

5. The method of claim 4, wherein generating the event is based on information about generating the event included in the annotations.

6. The method of claim 1, further comprising identifying, by the processor, the event infrastructure configured to receive the event based on configuration data that maps the entity to the event infrastructure.

7. The method of claim 1, wherein the request is received from a target application.

8. The method of claim 7, wherein the event infrastructure includes a message broker, and the message broker is configured to transmit the event to the target application.

9. The method of claim 1, further comprising:
   determining that more than a threshold number of data values were updated; and
   reconstructing the entity based on the determination that that more than a threshold number of data values were updated.

10. A system for generating events, the system comprising:
    a memory; and
    a processor coupled to the memory, the processor being configured to;
    receive a request to subscribe to an event type for an application;
    identify an entity in a data model corresponding to the event type, wherein the entity is associated with application data of the application, wherein the entity comprises one or more data fields corresponding to the application, including a first data field and a second data field;
    subscribe to receive an alert associated with any change to the entity in the data model;
    receive the alert indicating a first change to the entity in the data model, wherein the alert includes the change to the entity
    identify a first threshold associated with the first data field and a second threshold associated with the second data field, wherein the first threshold is different from the second threshold;
    determine that the first change comprises a change to the first data field exceeding the first threshold, or a change to the second data field exceeding the second threshold;
    generate an event corresponding to the event type based on the first change to the entity; and
    transmit the event to an event infrastructure.

11. The system of claim 10, wherein to receive the alert, the processor is configured to receive the alert from a change data capture engine, and wherein the change data capture engine is configured to identify one or more data fields in the data model corresponding to the entity, generate one or more triggers in the one or more data fields to capture changes in data in the one or more data fields, format the data in a first predetermined format, and transmit formatted data in the alert.

12. The system of claim 11, wherein the processor is further configured to commit the changes to the data in the one or more data fields in a data storage device corresponding to the data capture engine.

13. The system of claim 10, wherein the processor is further configured to identify the event infrastructure configured to receive the event based on configuration data that maps the entity to the event infrastructure.

14. The system of claim 10, wherein the request is received from a target application.

15. The system of claim 14, wherein the event infrastructure includes a message broker, and the message broker is configured to transmit the event to the target application.

16. A non-transitory computer-readable medium having instructions stored thereon that, when executed by at least one computing device, cause the at least one computing device to perform operations comprising, the operations comprising:
   receiving a request to subscribe to an event type for an application;
   identifying an entity in a data model corresponding to the event type, wherein the entity is associated with application data of the application, wherein the entity comprises one or more data fields corresponding to the application, including a first data field and a second data field;
   subscribing to receive an alert associated with any change to the entity in the data model;
   receiving the alert indicating a first change to the entity in the data model, wherein the alert includes the change to the entity;
   identifying a first threshold associated with the first data field and a second threshold, associated with the second data field, wherein the first threshold is different from the second threshold;
   determining that the first change comprises a change to the first data, field exceeding the first threshold, or a change to the second data field exceeding the second threshold;
   generating an event corresponding to the event type based on the first change to the entity; and
   transmitting the event to an event infrastructure.

17. The non-transitory computer-readable medium of claim 16, wherein receiving the alert comprises receiving the alert from a change data capture engine, and wherein the change data capture engine is configured to identify one or more data fields in the data model corresponding to the entity, generate one or more triggers in the one or more data fields to capture changes in data in the one or more data fields, format the data in a first predetermined format, and transmit formatted data in the alert.

18. The non-transitory computer-readable medium of claim 16, wherein the request is received from a target application, the event infrastructure includes a message broker, and the message broker is configured to transmit the event to the target application.

* * * * *